US010767109B2

(12) United States Patent
Isaji et al.

(10) Patent No.: US 10,767,109 B2
(45) Date of Patent: *Sep. 8, 2020

(54) METHOD FOR MANUFACTURING CARBONACEOUS LUMINESCENT MATERIAL

(71) Applicant: NISSAN CHEMICAL INDUSTRIES, LTD., Tokyo (JP)

(72) Inventors: Tadayuki Isaji, Funabashi (JP); Naoki Otani, Funabashi (JP); Masahiro Ueda, Kyoto (JP); Takayoshi Kawasaki, Kyoto (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 227 days.

This patent is subject to a terminal disclaimer.

(21) Appl. No.: 15/549,844

(22) PCT Filed: Feb. 2, 2016

(86) PCT No.: PCT/JP2016/052977
§ 371 (c)(1),
(2) Date: Aug. 9, 2017

(87) PCT Pub. No.: WO2016/129441
PCT Pub. Date: Aug. 18, 2016

(65) Prior Publication Data
US 2018/0022994 A1    Jan. 25, 2018

(30) Foreign Application Priority Data

Feb. 10, 2015 (JP) ................................ 2015-023819

(51) Int. Cl.
*C09K 11/65* (2006.01)
*C09K 11/08* (2006.01)
*C01B 32/184* (2017.01)

(52) U.S. Cl.
CPC ............ *C09K 11/65* (2013.01); *C01B 32/184* (2017.08); *C09K 11/08* (2013.01)

(58) Field of Classification Search
CPC ....... C09K 11/65; C09K 11/08; C01B 32/184; C01B 2204/20; C01B 32/182; H01L 29/1606; H01L 51/0045; H01L 51/502; B01J 31/04; G01N 33/588
See application file for complete search history.

(56) References Cited

U.S. PATENT DOCUMENTS 5,962,735 A * 10/1999 Kulprathipanja ....... C07B 63/00
562/606

FOREIGN PATENT DOCUMENTS

| CN | 103482598 A | * | 1/2014 | |
|---|---|---|---|---|
| CN | 104045076 B | | 1/2016 | |
| JP | 2015-36389 A | | 2/2015 | |
| WO | WO 2012/016296 A1 | | 2/2012 | |
| WO | WO-2012016296 A1 | * | 2/2012 | ............. C01B 32/15 |
| WO | WO 2014/084797 A1 | | 6/2014 | |
| WO | WO-2014084797 A1 | * | 6/2014 | ........... C01B 32/184 |

OTHER PUBLICATIONS

Machine translation of CN-103482598-A, 10 pages. (Year: 2014).*
Extended European Search Report dated Oct. 1, 2018, in European Patent Application No. 16749085.3.
Zong et al., "Synthesis of photoluminescent carbogenic dots using mesoporous silica spheres as nanoreactors—Supporting information," Chemical Communications (Jan. 1, 2011), vol. 47, No. 2, pp. 764-766.
Dong et al., "Carbon-Based Dots Co-doped with Nitrogen and Sulfur for High Quantum Yield and Excitation-Independent Emission", Angewandte Chemie, vol. 125, 2013, pp. 7954-7958.
Hayashi et al., "Development of high efficiency fluorescent carbogenic dots", Bulletin of Tokyo Metropolitan Industrial Technology Research Institute, Sep. 25, 2014, No. 9, pp. 86 to 87.
International Search Report for PCT/JP2016/052977 (PCT/ISA/210) dated May 10, 2016.
Shen et al., "Graphene quantum dots: emergent nanolights for bioimaging, sensors, catalysis and photovoltaic devices", Chem. Commun., vol. 48, 2012, pp. 3686-3699.
Tang et al., "Deep Ultraviolet Photoluminescence of Water-Soluble Self-Passivated Graphene Quantum Dots", ACS Nano, vol. 6, No. 6, 2012, pp. 5102-5110.
Wang et.al, "Structural evolution of graphene quantum dots during thermal decomposition of citric acid and the corresponding photoluminescence", Carbon, vol. 82, 2015, pp. 304-313.
Written Opinion of the International Searching Authority for PCT/JP2016/052977 (PCT/ISA/237) dated May 10, 2016.

* cited by examiner

*Primary Examiner* — Matthew E. Hoban
*Assistant Examiner* — Lynne Edmondson
(74) *Attorney, Agent, or Firm* — Birch, Stewart, Kolasch & Birch, LLP

(57) ABSTRACT

Provided is a method for manufacturing a carbonaceous luminescent material in which a polycarboxylic-acid-containing starting material, an acid catalyst, and a solvent are mixed together and heated.

11 Claims, No Drawings

METHOD FOR MANUFACTURING CARBONACEOUS LUMINESCENT MATERIAL

TECHNICAL FIELD

The present invention relates to a method for manufacturing a carbonaceous luminescent material.

BACKGROUND ART

Carbonaceous luminescent materials have been attracting attention recently as luminescent materials. One type of carbonaceous luminescent material is graphene quantum dots. Graphene quantum dots are expected to be superior to semiconductor quantum dots in terms of, for example, price, safety and chemical stability.

Existing methods for producing carbonaceous luminescent materials are broadly divided into two types: top-down methods and bottom-up methods (Non-Patent Document 1). The top-down approach refers to methods of preparation that use physical and chemical techniques to break down to the nano level bulk substances having a graphite structure, such as carbon fibers, coke or oxidized graphene. Although top-down methods are capable of mass production, narrow-band emission is difficult and so carbonaceous luminescent materials endowed with industrially useful emission characteristics are not manufactured in this way.

The bottom-up approach uses a low-molecular-weight compound as the carbon source and carries out chemical synthesis by firing or a hydrothermal reaction. By applying a suitable dope to the product, a carbonaceous luminescent material that exhibits a very high quantum yield of about 70% or more is produced via a dry process which involves firing cystine as the starting material. However, the yield is very low (Non-Patent Document 2).

In addition, Non-Patent Document 3 describes a bottom-up approach for producing carbonaceous luminescent material by a wet process. However, even when this method was repeatedly carried out under the same reaction conditions, it was not possible to obtain a carbonaceous luminescent material. Hence, the reproducibility of this method is questionable.

PRIOR ART DOCUMENTS

Non-Patent Documents

Non-Patent Document 1: *Chem. Commun.*, 48, pp. 3686-3699 (2012)
Non-Patent Document 2: *Angew. Chem.*, 125, pp. 7954-7958 (2013)
Non-Patent Document 3: *ACS Nano.*, 6, pp. 5102-5110 (2012)

SUMMARY OF THE INVENTION

Problems to be Solved by the Invention

It is therefore an object of the present invention to provide a method that can reproducibly and conveniently synthesize in a high yield a carbonaceous luminescent material which exhibits a high quantum yield and has excellent emission characteristics.

Means for Solving the Problems

The inventors have conducted extensive investigations in order to achieve the above object. As a result, they have discovered that a carbonaceous luminescent material can be obtained by mixing together and heating a polycarboxylic acid-containing starting material, an acid catalyst and a solvent, and that this material exhibits a high quantum yield.

Accordingly, the invention provides the following method for manufacturing a carbonaceous luminescent material.

1. A method for manufacturing a carbonaceous luminescent material, which method includes the step of mixing together and heating a polycarboxylic acid-containing starting material, an acid catalyst and a solvent.
2. The method for manufacturing a carbonaceous luminescent material of 1 above, wherein the polycarboxylic acid is citric acid.
3. The method for manufacturing a carbonaceous luminescent material of 1 or 2 above, wherein the starting material further contains an amino group-containing compound.
4. The method for manufacturing a carbonaceous luminescent material of 3 above, wherein the amino group-containing compound is an amino acid.
5. The method for manufacturing a carbonaceous luminescent material of 4 above, wherein the amino acid is cysteine.
6. The method for manufacturing a carbonaceous luminescent material of any of 1 to 5 above, wherein the acid catalyst is a heterogeneous acid catalyst formed as a porous body having pores.
7. The method for manufacturing a carbonaceous luminescent material of any of 1 to 6 above, wherein a surfactant is further admixed.
8. The method for manufacturing a carbonaceous luminescent material of any of 1 to 7 above, wherein the carbonaceous luminescent material has a graphene structure.
9. The method for manufacturing a carbonaceous luminescent material of any of 1 to 8 above, wherein the carbonaceous luminescent material emits light having a wavelength of from 380 to 480 nm.

Advantageous Effects of the Invention

The method for manufacturing a carbonaceous luminescent material of this invention enables carbonaceous luminescent materials having a high quantum yield and excellent emission characteristics to be reproducibly and conveniently synthesized in a high yield.

EMBODIMENT FOR CARRYING OUT THE INVENTION

The inventive method for manufacturing a carbonaceous luminescent material mixes together and heats a polycarboxylic acid-containing starting material, an acid catalyst and a solvent.

The polycarboxylic acid is not particularly limited, provided it is a starting material of the carbonaceous luminescent material and is a carboxylic acid having two or more carboxyl groups. Illustrative examples include citric acid, oxalic acid, malonic acid, succinic acid, fumaric acid, itaconic acid, malic acid and tartaric acid. Of these, citric acid, succinic acid, and oxalic acid are preferred, with citric acid being more preferred. The polycarboxylic acid may be of one type used alone or two or more types may be used in combination.

It is preferable for the starting material to further include an amino group-containing compound. Preferred amino group-containing compounds include amino acids, amino group-containing polyalkylene glycols, and primary aliphatic amines. Of these, amino acids are especially preferred. The amino group-containing compound may be of one type used alone or two or more types may be used in combination.

Examples of amino acids include cysteine, glycine, alanine, valine, phenylalanine, threonine, lysine, asparagine, tryptophan, serine, glutamic acid, aspartic acid, ornithine, thyroxine, cystine, leucine, isoleucine, proline, tyrosine, asparagine, glutamine, histidine, methionine and threonine. Examples of amino group-containing polyalkylene glycols include amino group-containing polyethylene glycols and amino group-containing polypropylene glycols. Of these, cysteine, glycine and amino group-containing polyethylene glycols are preferred. In cases where the amino acid has optical isomers, the amino acid may be either the D form or the L form, or may be a racemic mixture.

The amount of amino group-containing compound used, from the standpoint of uniform nitrogen incorporation efficiency, is preferably from 10 to 90 parts by weight, and more preferably from 20 to 80 parts by weight, per 100 parts by weight of polycarboxylic acid.

Organic compounds other than polycarboxylic acids and amino group-containing compounds may be additionally used as starting materials. Such organic compounds are not particularly limited, provided they are not detrimental to the advantageous effects of the invention.

The acid catalyst may be a homogeneous acid catalyst or a heterogeneous acid catalyst, although from the standpoint of improving the quantum yield, a heterogeneous acid catalyst is preferred. Examples of homogeneous acid catalysts include inorganic acids such as hydrochloric acid, sulfuric acid, nitric acid and phosphoric acid, and organic acids such as sulfonic acid and p-toluenesulfonic acid. The heterogeneous acid catalyst is preferably a solid acid catalyst, examples of which include cationic ion-exchange resins, cationic ionic-exchange membranes, and the solid acid catalysts mentioned in Nature 438, p. 178 (2005). Commercial products may be used as the solid acid catalyst; examples include the ion-exchange resins AMBERLYST® 15, 16, 31 and 35 and AMBERLITE® IR120B, IR124, 200CT and 252 from Rohm and Haas Company, NAFION ion-exchange membranes from E.I. DuPont de Nemours and Co., and inorganic solid acid catalysts such as zeolite and polyphosphoric acid. These acid catalysts may be of one type used alone or two or more types may be used in combination.

In cases where a homogeneous acid catalyst is used, the homogeneous acid catalyst is typically added in an amount of preferably from 0.01 to 10 wt %, more preferably from 0.1 to 5 wt %, and even more preferably from 0.5 to 1 wt %, based on the weight of the starting materials.

The heterogeneous acid catalyst is preferably a porous body having pores which are capable of including therein the carbonaceous luminescent material that has formed. The particle size or disc diameter of the carbonaceous luminescent material that is formed can be controlled by the size of these pores. Generally, it is preferable to manufacture a carbonaceous luminescent material having a particle size (disc diameter) of up to 20 nm using a porous solid acid catalyst having a pore size of up to 20 nm.

When using a heterogeneous acid catalyst, the amount typically added with respect to the weight of the starting material is preferably from 0.1 to 100 wt %, more preferably from 1.0 to 50 wt %, and even more preferably from 5.0 to 10 wt %.

The solvent is not particularly limited, provided it is one that can dissolve the starting materials used. Examples of such solvents include water, dimethylsulfoxide, dimethylformamide, dimethylacetamide, N-methyl-2-pyrrolidone, hexamethylphosphoric triamide, acetonitrile, acetone, alcohols (methanol, ethanol, 1-propanol, 2-propanol, etc.), glycols (ethylene glycol, triethylene glycol, etc.), cellosolves (ethyl cellosolve, methyl cellosolve, etc.), polyhydric alcohols (glycerol, pentaerythritol, etc.), tetrahydrofuran, toluene, ethyl acetate, butyl acetate, benzene, toluene, xylene, pentane, hexane, heptane, chlorobenzene, dichlorobenzene, trichlorobenzene, hexadecane, benzyl alcohol and oleyl amine. Of these, water and toluene are preferred. The solvent may be of one type used alone or two or more may be used in admixture.

In order to prepare a carbonaceous luminescent material of a uniform particle size, the amount of solvent used is preferably from 100 to 10,000 parts by weight, and more preferably from 400 to 2,500 parts by weight, per 100 parts by weight of the starting material.

The inventive method of manufacture may be carried out in the presence of a surfactant. Cationic surfactants, anionic surfactants and nonionic surfactants are preferred as the surfactant.

Examples of cationic surfactants include cetyltrimethylammonium bromide (CTABr) and cetyltrimethylammonium chloride (CTACl). Examples of anionic surfactants include sodium dodecyl sulfate (SDS) and sodium dodecylbenzene sulfonate. Examples of nonionic surfactants include polyethylene glycol (PEG) and polypropylene glycol (PPG). These surfactants may be of one type used alone or two or more types may be used in combination.

In terms of the dispersibility of the starting materials and the critical micelle concentration under the synthesis conditions, the amount of surfactant used is preferably from 10 to 2,000 parts by weight, and more preferably from 50 to 500 parts by weight, per 100 parts by weight of the starting materials.

The production method of the invention involves mixing together and heating the starting materials, acid catalyst, solvent and, optionally, a surfactant. The mixture of these ingredients may be carried out in any order. For example, the starting material and the optional surfactant may first be added to the solvent, followed by addition of the acid catalyst; alternatively, the starting material, acid catalyst and optional surfactant may be added at the same time to the solvent.

Heating may be carried out under normal pressure (atmospheric pressure) or under applied pressure. When carried out under applied pressure, the reaction temperature can be increased to or above the boiling point under normal pressure, and so the reaction time can be shortened relative to when reaction is carried out at normal pressure.

In cases where pressure is to be applied, use may be made of, for example, an autoclave. By using an autoclave, the reaction temperature can be increased to or above the boiling point at normal pressure. For example, when water is used as the solvent, a reaction temperature of about 200° C. can easily be attained by carrying out the reaction using an autoclave.

The applied pressure is not particularly limited, provided that the desired reaction temperature can be attained, but in general is preferably from about 200 kPa to about 2.0 MPa, and more preferably from about 500 kPa to about 1.0 MPa.

When the reaction is carried out at normal pressure, although the reaction temperature varies also with the boiling point of the solvent used, in general it is preferably from about 40 to about 250° C., more preferably from 60 to 200° C., and even more preferably from 100 to 150° C. Heating is generally carried out on a water bath or an oil bath, although microwave heating is also possible. In cases where, for example, water is used as the solvent, the product can be obtained in a shorter time by microwave heating than by heating on a water bath or an oil bath.

When the reaction is carried out at normal pressure, the reaction time is preferably from about 1 minute to about 240 hours, more preferably from about 10 minutes to about 48 hours, and even more preferably from about 12 to about 30 hours. When the reaction is carried out under applied pressure, the reaction time is preferably from about 1 minute to about 24 hours, more preferably from about 10 minutes to about 12 hours, and even more preferably from about 30 minutes to about 3 hours.

When a solid acid catalyst is used, it is preferable to carry out the reaction under stirring, with better results being obtained by increasing the stirring rate within a range that does not break up the solid catalyst. The stirring rate is preferably from about 10 rpm to about 500 rpm, and more preferably from about 50 rpm to about 300 rpm.

The resulting product can be purified by using a technique such as dialysis or ultrafiltration to remove low-molecular-weight impurities and then using centrifugal separation or the like to remove high-molecular-weight impurities. The pore size of the dialysis membrane or ultrafiltration membrane and the centrifugal force during centrifugal separation may be suitably set according to the molecular weights of the substances to be removed.

Column purification may be carried for purification to a higher degree of purity. The column packing used in such cases may be a normal-phase packing or a reverse-phase packing. Normal-phase packings that may be used include silica particles and alumina particles. Reverse-phase packings that may be used include silica particles that have been surface-modified with long-chain alkyl groups. Also, pressure may be applied during column purification in order to shorten the time taken by this operation.

From the standpoint of such considerations as chemical stability, luminescence quantum yield and control of the emission characteristics, the carbonaceous luminescent material produced by the method of the invention preferably includes a graphene structure.

The carbonaceous luminescent material is preferably one which emits light at a wavelength of from 380 to 480 nm.

The carbonaceous luminescent material produced by the method of the invention typically has a quantum yield that is preferably at least 30%, more preferably at least 50%, and even more preferably at least 60%. The half-width (full width at half maximum) of the emission spectrum is preferably 100 nm or less, more preferably 90 nm or less, and even more preferably 80 nm or less.

EXAMPLES

Working Examples are given below to more concretely illustrate the invention, although the invention is not limited by these Examples. The equipment used was as follows.
 (1) Fluorescence Spectrum: FP-6500, from JASCO Corporation
 (2) Measurement of Quantum Yield: UV-3600 from Shimadzu Corporation, and FP-6500 from JASCO Corporation.

[1] Sample Preparation

Working Example 1

A solution was prepared by placing 0.67 g (3.1 mmol) of citric acid monohydrate, 0.33 g (2.72 mmol) of L-cysteine and 24 mL of deionized water in a 100 mL three-neck flask fitted with a Dimroth condenser and a thermometer. A stirrer and 0.05 g of Amberlyst 15 were added to the resulting solution and reaction was carried out for 95 hours under stirring and refluxing, giving an aqueous dispersion containing Carbonaceous Luminescent Material 1.

Working Example 2

A solution of 0.67 g (3.1 mmol) of citric acid monohydrate and 0.33 g (2.72 mmol) of L-cysteine dissolved in 24 mL of deionized water was placed in a 50 mL sample bottle. A stirrer and 0.05 g of Amberlyst 15 were added to the resulting solution. This system was placed in an inner Teflon® chamber mounted within a stainless steel autoclave, and the temperature was raised to 200° C. over 40 minutes. The pressure rose gradually and, 30 minutes after the temperature had reached 200° C., remained constant at 0.8 MPa. The system was reacted for 30 minutes in this state and then allowed to cool to room temperature. The brown-colored precipitate and the solid catalyst were removed with a 0.2 μm filter, giving a light yellow-colored solution. This gave an aqueous dispersion containing Carbonaceous Luminescent Material 2.

Working Example 3

A solution was prepared by placing 0.40 g (1.9 mmol) of citric acid monohydrate, 0.10 g (0.8 mmol) of L-cysteine and 0.5 mL of deionized water in a 100 mL three-neck flask. The resulting solution was impregnated into 0.05 g of Nafion (E.I. DuPont de Nemours & Co.), and reacted at 100° C. for 25 hours. The product was extracted from the Nafion with 10 mL of water, giving an aqueous dispersion of Carbonaceous Luminescent Material 3.

Working Example 4

A solution was prepared by placing 0.80 g (3.8 mmol) of citric acid monohydrate, 0.20 g (1.7 mmol) of L-cysteine and 24 mL of deionized water in a 50 mL sample bottle. A stirrer and 0.05 g of Amberlyst 15 were added to the resulting solution. This system was placed in an inner Teflon® chamber mounted within a stainless steel autoclave, and the temperature was raised to 200° C. over 40 minutes. The pressure rose gradually and, 30 minutes after the temperature had reached 200° C., remained constant at 0.8 MPa. The system was reacted for 30 minutes in this state and then allowed to cool to room temperature. The brown-colored precipitate and the solid catalyst were removed with a 0.2 μm filter, giving a yellow-colored solution. This gave an aqueous dispersion containing Carbonaceous Luminescent Material 4.

Working Example 5

A solution was prepared by placing 0.8 g (3.8 mmol) of citric acid monohydrate, 0.2 g (1.7 mmol) of L-cysteine, 2.5 g (8.7 mmol) of SDS and 2.5 mL of deionized water in a 50 mL sample bottle. A stirrer and 0.05 g of concentrated sulfuric acid were added to the resulting solution. This system was placed in an inner Teflon® chamber mounted within a stainless steel autoclave, and the temperature was raised to 200° C. over 40 minutes. The pressure rose gradually and, 30 minutes after the temperature had reached 200° C., remained constant at 0.8 MPa. The system was reacted for 90 minutes in this state and then allowed to cool to room temperature. The brown-colored precipitate and the solid catalyst were removed with a 0.2 μm filter, giving an ocher-colored solution. This gave an aqueous dispersion containing Carbonaceous Luminescent Material 5.

Working Example 6

A solution was prepared by placing 0.80 g (3.8 mmol) of citric acid monohydrate, 0.20 g (1.7 mmol) of L-cysteine, 2.5 g (8.7 mmol) of SDS and 2.5 mL of deionized water in a 100 mL three-neck flask fitted with a Dimroth condenser and a thermometer. A stirrer and 0.05 g of concentrated sulfuric acid were added to the resulting solution and reaction was carried out for 40 hours under stirring and refluxing. After the reaction mixture was allowed to cool, the reaction system solidified, and so the soluble matter was extracted with 20 mL of water. This gave an aqueous dispersion containing Carbonaceous Luminescent Material 6.

Working Example 7

Aside from using 0.7 g (3.3 mmol) of citric acid monohydrate and 0.10 g (0.83 mmol) of L-cysteine, an aqueous dispersion containing Carbonaceous Luminescent Material 7 was obtained in the same way as in Working Example 4.

Working Example 8

Aside from using 0.51 g (2.4 mmol) of citric acid monohydrate and 0.29 g (2.4 mmol) of L-cysteine, an aqueous dispersion containing Carbonaceous Luminescent Material 8 was obtained in the same way as in Working Example 4.

Working Example 9

Aside from using 0.73 g (3.4 mmol) of citric acid monohydrate and 0.28 g (2.3 mmol) of L-cysteine, an aqueous dispersion containing Carbonaceous Luminescent Material 9 was obtained in the same way as in Working Example 4.

Working Example 10

A solution was prepared by placing 0.51 g (2.4 mmol) of citric acid monohydrate, 0.29 g (2.4 mmol) of L-cysteine, 0.80 g (2.8 mmol) of SDS and 4 mL of deionized water in a 100 mL three-neck flask fitted with a Dimroth condenser and a thermometer. A stirrer and 0.05 g of Amberlyst 15 were added to the resulting solution and the reaction was carried out for 15 hours under stirring and refluxing. During the reaction, water was removed with a Dean-Stark trap. The resulting ocher-colored insoluble matter and ocher-colored solution were filtered with a 0.2 μm filter, giving a toluene solution containing Carbonaceous Luminescent Material 10.

Working Example 11

A solution was prepared by placing 0.63 g (3.0 mmol) of citric acid monohydrate, 0.37 g (3.0 mmol) of L-cysteine, 2.0 g of the Carbonaceous Luminescent Material 2-containing aqueous dispersion prepared in Working Example 2 and 22 mL of deionized water in a 50 mL sample bottle. A stirrer and 0.05 g of Amberlyst 15 were added to the resulting solution. This system was placed in an inner Teflon® chamber mounted within a stainless steel autoclave, and the temperature was raised to 200° C. over 40 minutes. The pressure rose gradually and, 30 minutes after the temperature had reached 200° C., remained constant at 0.8 MPa. The system was reacted for 30 minutes in this state and then allowed to cool to room temperature. The brown-colored precipitate and the solid catalyst were removed with a 0.2 μm filter, giving an ocher-colored solution. This gave an aqueous dispersion containing Carbonaceous Luminescent Material 11.

Working Example 12

Aside from using 0.75 g (3.6 mmol) of citric acid monohydrate and 0.05 g (0.41 mmol) of L-cysteine, an aqueous dispersion containing Carbonaceous Luminescent Material 12 was obtained in the same way as in Working Example 4.

Working Example 13

Aside from using 0.64 g (3.1 mmol) of citric acid monohydrate and 0.36 g (3.0 mmol) of L-cysteine, and using 0.05 g of concentrated sulfuric acid instead of Amberlyst 15, an aqueous dispersion containing Carbonaceous Luminescent Material 13 was obtained in the same way as in Working Example 4.

Working Example 14

A solution was prepared by placing 0.67 g (3.1 mmol) of citric acid monohydrate, 0.33 g (2.72 mmol) of L-cysteine and 24 mL of deionized water in a 50 mL sample bottle. An amount of 0.05 g of Nafion (E.I. DuPont de Nemours & Co.) cut into small strips about 1 mm wide and 5 mm long was added to the resulting solution. This system was placed in an inner Teflon® chamber mounted within a stainless steel autoclave, and the temperature was raised to 200° C. over 40 minutes. The pressure rose gradually and, after 30 minutes, remained constant at 0.7 MPa. The system was reacted for 90 minutes in this state and then allowed to cool to room temperature. The brown-colored precipitate and the solid catalyst were removed with a 0.2 μm filter, giving an orange-colored solution. This gave an aqueous dispersion containing Carbonaceous Luminescent Material 14.

Working Example 15

Aside from using 25 mL of toluene instead of deionized water, a toluene solution containing Carbonaceous Luminescent Material 15 was obtained in the same way as in Working Example 5.

Working Example 16

Aside from using 0.24 g of phosphoric acid instead of concentrated sulfuric acid, an aqueous dispersion containing Carbonaceous Luminescent Material 16 was obtained in the same way as in Working Example 13.

Working Example 17

A solution was prepared by placing 0.20 g (0.95 mmol) of citric acid monohydrate and 0.5 mL (0.56 mmol) of the PEG-diamine of the formula shown below (Sigma-Aldrich) in a 100 mL three-neck flask fitted with a Dimroth condenser and a thermometer. A stirrer and 2.0 g of phosphoric acid were added to the resulting solution and the reaction was carried out for 40 hours at 90° C., thereby giving Carbonaceous Luminescent Material 17 as a viscous black material.

[Chemical Formula 1]

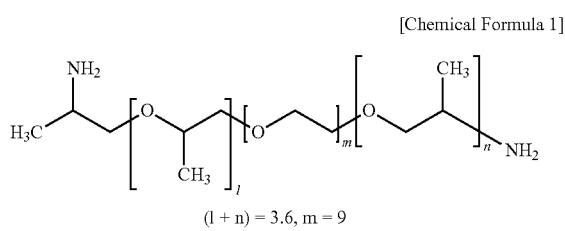

$(l + n) = 3.6, m = 9$

Working Example 18

Aside from using 0.54 g (2.6 mmol) of citric acid monohydrate and 0.46 g (3.8 mmol) of L-cysteine, an aqueous dispersion containing Carbonaceous Luminescent Material 18 was obtained in the same way as in Working Example 4.

[2] Measurement of Quantum Yield

The fluorescence spectrum and the quantum yield were measured for the polymers obtained in the respective Working Examples. The results are presented in Table 1.

TABLE 1

| Example | Carbonaceous luminescent material | Major fluorescence characteristics | | | |
|---|---|---|---|---|---|
| | | Excitation wavelength (nm) | Fluorescence wavelength (nm) | Quantum yield (%) | Half-width (nm) |
| 1 | 1 | 352 | 430 | 63.95 | 75 |
| 2 | 2 | 350 | 425 | 60.84 | 72 |
| 3 | 3 | 365 | 432 | 81.01 | 74 |
| 4 | 4 | 365 | 431 | 68.04 | 75 |
| 5 | 5 | 365 | 439 | 65.91 | 71 |
| 6 | 6 | 365 | 433 | 65.55 | 75 |
| 7 | 7 | 365 | 432 | 64.77 | 75 |
| 8 | 8 | 365 | 429 | 60.84 | 75 |
| 9 | 9 | 365 | 430 | 60.54 | 75 |
| 10 | 10 | 370 | 431 | 59.88 | 66 |
| 11 | 11 | 355 | 436 | 57.56 | 74 |
| 12 | 12 | 365 | 435 | 54.57 | 74 |
| 13 | 13 | 365 | 426 | 53.33 | 72 |
| 14 | 14 | 365 | 424 | 52.23 | 73 |
| 15 | 15 | 370 | 429 | 47.41 | 66 |
| 16 | 16 | 365 | 435 | 41.30 | 74 |
| 17 | 17 | 355 | 423 | 39.70 | 70 |
| 18 | 18 | 365 | 418 | 35.99 | 63 |

As shown in Table 1, the carbonaceous luminescent materials obtained by the method of the invention had high quantum yields.

The invention claimed is:

1. A method for manufacturing a carbonaceous luminescent material, comprising the step of mixing together and heating a starting material containing a polycarboxylic acid and an amino group-containing compound, an acid catalyst and a solvent,
wherein the acid catalyst is a heterogeneous acid catalyst,
wherein the heterogeneous acid catalyst is a solid acid catalyst selected from cationic ion-exchange resins, cationic ionic-exchange membranes, and polyphosphoric acid, and
wherein the solvent consists of water.

2. The method for manufacturing a carbonaceous luminescent material of claim 1, wherein the polycarboxylic acid is citric acid.

3. The method for manufacturing a carbonaceous luminescent material of claim 1 or 2, wherein the amino group-containing compound is an amino acid.

4. The method for manufacturing a carbonaceous luminescent material of claim 3, wherein the amino acid is cysteine.

5. The method for manufacturing a carbonaceous luminescent material of claim 1, wherein the acid catalyst is a heterogeneous acid catalyst formed as a porous body having pores.

6. The method for manufacturing a carbonaceous luminescent material of claim 1, wherein a surfactant is further admixed.

7. The method for manufacturing a carbonaceous luminescent material of claim 1, wherein the carbonaceous luminescent material has a graphene structure.

8. The method for manufacturing a carbonaceous luminescent material of claim 1, wherein the carbonaceous luminescent material emits light having a wavelength of from 380 to 480 nm.

9. The method for manufacturing a carbonaceous luminescent material of claim 1, wherein the amino group-containing compound is selected from amino acids, and amino group-containing polyalkylene glycols.

10. The method for manufacturing a carbonaceous luminescent material of claim 1, wherein heating is carried out under normal pressure at a temperature of 40 to 250° C.

11. A method for manufacturing a carbonaceous luminescent material, comprising the step of mixing together and heating a starting material containing a polycarboxylic acid and an amino group-containing compound, an acid catalyst and a solvent,
wherein the acid catalyst is a heterogeneous acid catalyst,
wherein the heterogeneous acid catalyst is a solid acid catalyst selected from cationic ion-exchange resins, cationic ionic-exchange membranes, and polyphosphoric acid, and
wherein heating is carried out under applied pressure in the range of 200 kPa to 2.0 MPa.

* * * * *